United States Patent
Hatfield et al.

(10) Patent No.: US 7,318,287 B1
(45) Date of Patent: Jan. 15, 2008

(54) STEERING COLUMN MANUAL STAMPING FIXTURE

(75) Inventors: Bryan Hatfield, Gahanna, OH (US); Marc Iman, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 70 days.

(21) Appl. No.: 11/366,187

(22) Filed: Mar. 2, 2006

(51) Int. Cl.
*B25H 7/04* (2006.01)
*G01D 21/00* (2006.01)

(52) U.S. Cl. ............... 33/666; 33/600; 33/645

(58) Field of Classification Search ............. None
See application file for complete search history.

(56) References Cited

U.S. PATENT DOCUMENTS

| | | | | |
|---|---|---|---|---|
| 1,538,854 A | * | 5/1925 | Hull | 116/31 |
| 3,813,932 A | * | 6/1974 | Wallace | 73/118.1 |
| 4,363,173 A | * | 12/1982 | Caldera | 33/666 |
| 4,893,413 A | | 1/1990 | Merrill et al. | |
| 5,068,976 A | * | 12/1991 | Bell | 33/666 |
| 5,105,546 A | | 4/1992 | Weise et al. | |
| 5,165,179 A | | 11/1992 | Schoeninger | |
| 5,179,787 A | * | 1/1993 | Ostrowski | 33/613 |
| 5,878,505 A | * | 3/1999 | Scarpellini | 33/666 |
| 6,076,269 A | | 6/2000 | Sekino et al. | |
| 6,560,891 B1 | * | 5/2003 | Arnold | 33/670 |
| 6,604,279 B2 | | 8/2003 | Kurtz | |
| 6,726,228 B2 | | 4/2004 | Crawford | |
| 6,948,259 B1 | * | 9/2005 | Hatfield et al. | 33/645 |
| 7,036,240 B1 | * | 5/2006 | Hatfield et al. | 33/600 |
| 2003/0159303 A1 | | 8/2003 | Crawford | |
| 2005/0274033 A1 | * | 12/2005 | Kraemer | 33/645 |

FOREIGN PATENT DOCUMENTS

JP    5-193538    8/1993

* cited by examiner

*Primary Examiner*—Christopher W Fulton
(74) *Attorney, Agent, or Firm*—Rankin, Hill, Porter & Clark LLP; Vincent Ciamacco

(57) ABSTRACT

A manual steering column stamping fixture includes a body member and a linear bearing assembly. The linear bearing assembly is secured to the body member, and includes a marking punch that is driven into engagement with a steering column so as to place an alignment mark on the steering column. Once a center or neutral position of the steering column is located using a checking fixture, the stamping fixture is mounted over the checking fixture using cooperating slots provided by the body member and arms provided by the checking fixture, and such that the marking punch is disposed within the checking fixture and adjacent the steering column. Thereafter, the marking punch is manually moved away from the steering column and against spring bias such that, upon subsequent release of the bearing assembly, the marking punch is driven into the steering column to mark the steering column.

11 Claims, 4 Drawing Sheets

STEERING COLUMN MANUAL STAMPING FIXTURE

BACKGROUND OF THE INVENTION

1. Field of the Invention

The present invention is directed toward an apparatus and method for placing an alignment mark on a steering column to facilitate subsequent installation of a steering wheel thereon.

2. Description of Related Art

During the manufacture of automobiles, it is common to mark a steering column to indicate the neutral position or center position of the steering column. Placement of such a mark on the steering column permits an associate to subsequently orient the steering wheel such that the steering wheel is positioned in a neutral rotary orientation (i.e., not turned left or right) when the vehicle is traveling 'straight ahead'. Typically, such a steering column alignment mark is made on the steering column with the assistance of an automated machine. Thereafter, the steering column alignment mark may be tested to insure that it has been properly placed. For example, U.S. Pat. No. 6,948,259 and U.S. patent application Ser. No. 10/979,968, the entire disclosures of which are expressly incorporated herein by reference, illustrate two different apparatuses and methods for checking whether a steering column alignment mark has been properly located on the steering column.

While the aforementioned apparatus and methods work satisfactorily in checking whether an alignment mark has been properly placed, they are not adapted to accommodate situations in which the automated alignment and marking machinery is out of service. In these situations, with the assembly line would have to be shut down, or else the assembly line associate would be forced to make manual approximations to determine the center of the steering column (i.e., neutral position) for installation of the steering wheel. As will be appreciated, such manual approximation, while better than shutting the assembly line down, has proven to not be particularly effective or efficient.

Accordingly, there exists a need in the art for an apparatus and method for assisting in manually marking a center or neutral position of a steering column so as to permit subsequent accurate placement of a steering wheel thereover.

SUMMARY OF THE INVENTION

The present invention is directed toward an apparatus and method for manual marking of a steering column with an alignment mark showing a neutral or center position of the steering column so as to permit subsequent accurate placement of the steering wheel thereover.

A stamping fixture of the present invention is used in conjunction with a checking fixture that is operable to test or determine a center or neutral position of a steering column. More specifically, once a center or neutral position of the steering column is located using a steering check fixture, the stamping fixture of the present invention is used to place an alignment reference mark on the steering column.

More particularly, the present invention is directed toward a manual steering column stamping fixture that can be easily implemented by an associate, and serves to properly and permanently mark a neutral or center position of the steering column. The stamping fixture of the present invention is simple to place over the master steering check fixture, and is easy to operate, and may be used in conjunction with the master steering check fixture to manually mark the steering column during the limited time available during a modern vehicle manufacturing process.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
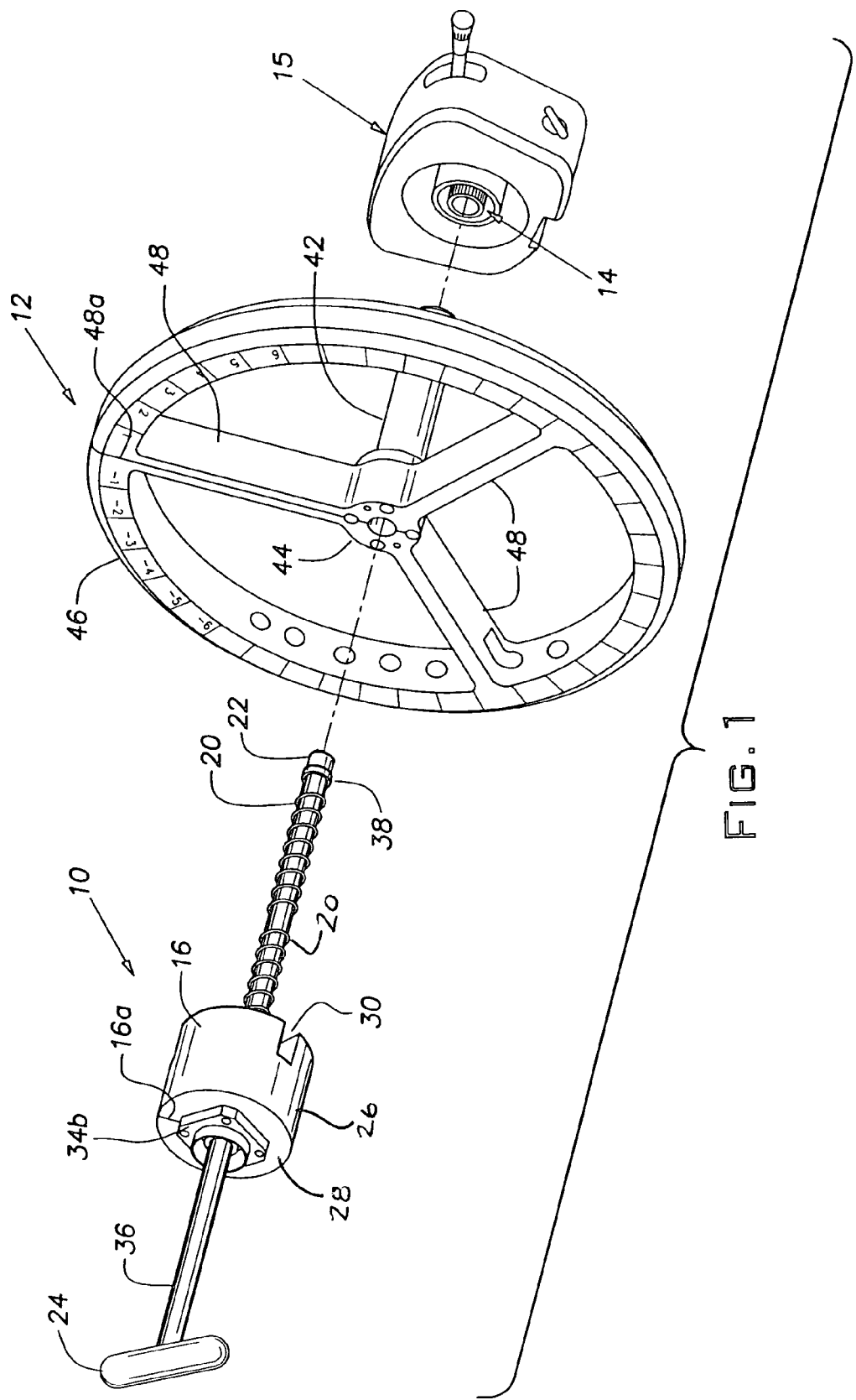
FIG. 1 is an exploded perspective view of a steering column assembly, master steering check fixture, and manual stamping fixture according to the present invention.
Figure 2:
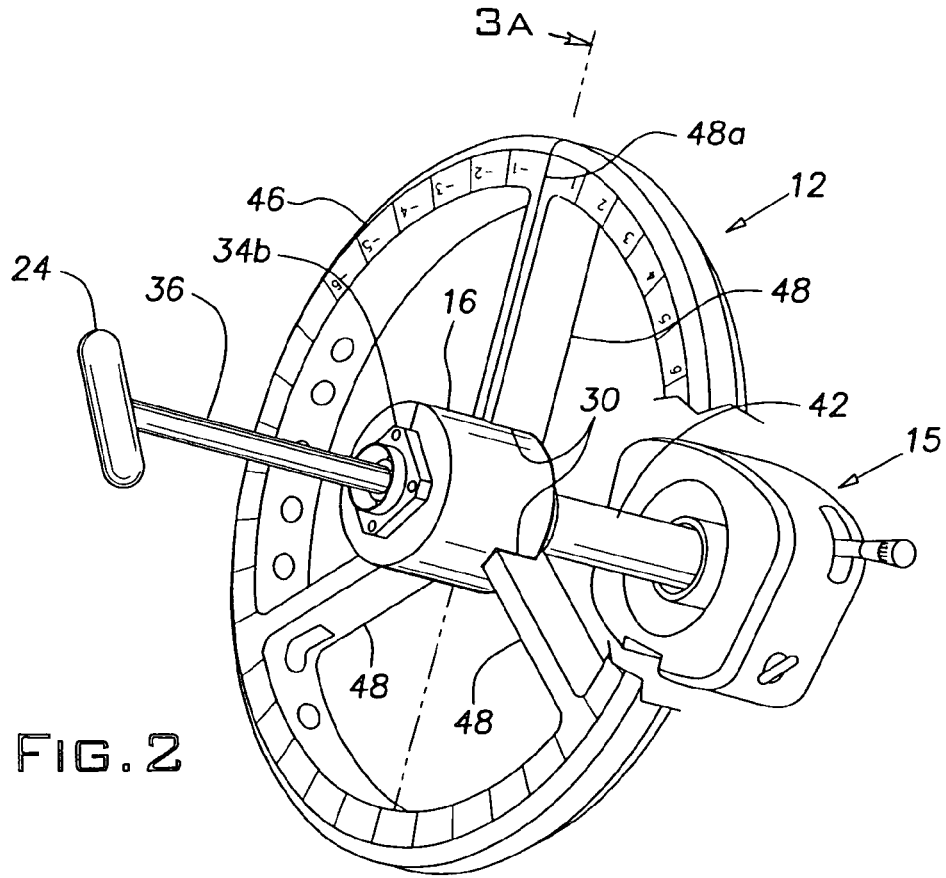
FIG. 2 is a perspective view similar to FIG. 1, but showing the master steering check fixture disposed over the steering column assembly, and the manual stamping fixture of the present invention mounted on the master steering check fixture.

With reference to FIGS. 1-2, the steering column manual stamping fixture 10 according to the present invention is designed and adapted for use in conjunction with a master steering check fixture 12. Preferably, the master steering check fixture 12 is adapted to permit manual checking and determination of a center or neutral position of a vehicle steering column 14, which is part of a conventional steering column assembly 15. Such a master steering check fixture 12 is shown in commonly owned U.S. patent application Ser. No. 10/979,968, the entire disclosure of which is expressly incorporated herein by reference. For purposes of brevity, and insofar as the '968 patent application is specifically directed toward the use of the master steering check fixture 12 in measuring or determining the center or neutral position of a host vehicle steering column 14, the disclosure contained therein will not be repeated hereinafter. Rather, the '968 application should be referred to for information regarding operation and usage of the master steering check fixture, which will primarily be discussed hereinafter as it relates to use or implementation of the steering column manual stamping fixture 10 of the present invention once the center/neutral steering column position is determined and with the master steering column check fixture 12 on a steering column 14.

With reference to FIGS. 3A-5, the manual steering column stamping fixture 10 of the present invention is shown to include a body member 16, a linear bearing assembly 18, compression springs 20, a marking punch 22, and a handle 24. The body member 16 is preferably cup-shaped, with a cylindrical sidewall 26 and an end wall 28. The cylindrical sidewall 26 has slots 30 formed therein. The slots 30 extend from a circular rim at an end of the sidewall 26 opposite the end wall 28 toward the end wall 28. The slots 30 have a predetermined depth and are disposed so as to fit over the arms of the manual steering column alignment fixture 12 in only one orientation, as will be apparent from the following disclosure. The body member end wall 28 has an opening formed therein through which the linear bearing assembly 18 extends.

Figure 5:
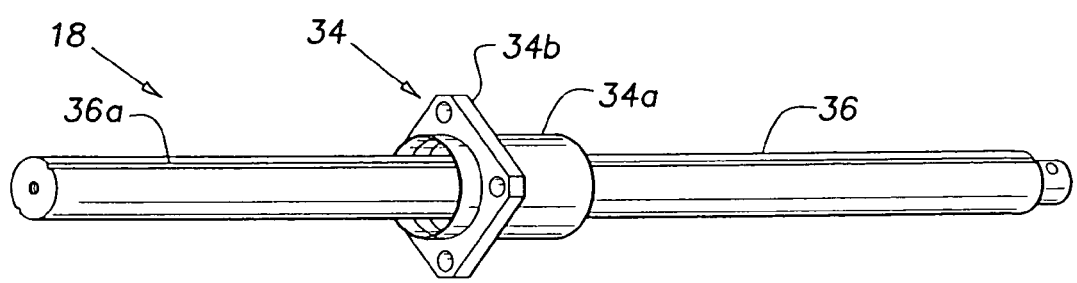
FIG. 5 is a perspective view of a linear bearing assembly, which is a component of the steering column manual stamping fixture.

More particularly, and as shown best in FIG. 5, the linear bearing assembly 18 includes a stationary body 34 that is affixed to the body member end wall 28, and a rod or shaft-like sliding member 36. The stationary body member 34 includes a recirculating ball bearing 34a and a mounting plate 34b. The recirculating ball bearing 34a has a first end and a second end, with the mounting plate 34b extending orthogonally from the first end of the recirculating ball bearing 34a. The second end of the recirculating ball bearing 34a is exposed at the bottom or inner side of the body member end wall 28. Therefore, the stationary body member 34 is received within the body member end wall 28 such that the mounting plate 34b lies on the outer surface of the end wall and the second end of the recirculating ball bearing 34a is exposed at the hollow interior of the body member 16 and is preferably flush with the inner surface of the end wall 28. Fasteners extend through openings in the mounting plate 34b to mechanically affix the linear bearing assembly 18 to the body member end wall 28.

The recirculating ball bearing 34a serves as a guide member that slidably receives the sliding member 36, which is a guided member. More particularly, the sliding member 36 is guided by the recirculating ball bearing 34a for sliding or linear motion only, with rotary movement between the sliding member 36 and the stationary body 34 being prevented by interaction between a bearing groove 36a on the sliding member 36 and corresponding ball bearings on the stationary body 34. It is noted that the linear bearing assembly 18 is a commercially available component. It is also considered apparent that numerous structures for preventing rotation of the sliding member 36 are known in the art and may be used interchangeably with the bearings and bearing groove described and shown herein. Further, while the sliding member 36 is shown as being circular in cross-section, this is not required. Rather, a D-shaped, square, or triangular or other-shaped sliding member could be used with equal functionality.

Figure 4:
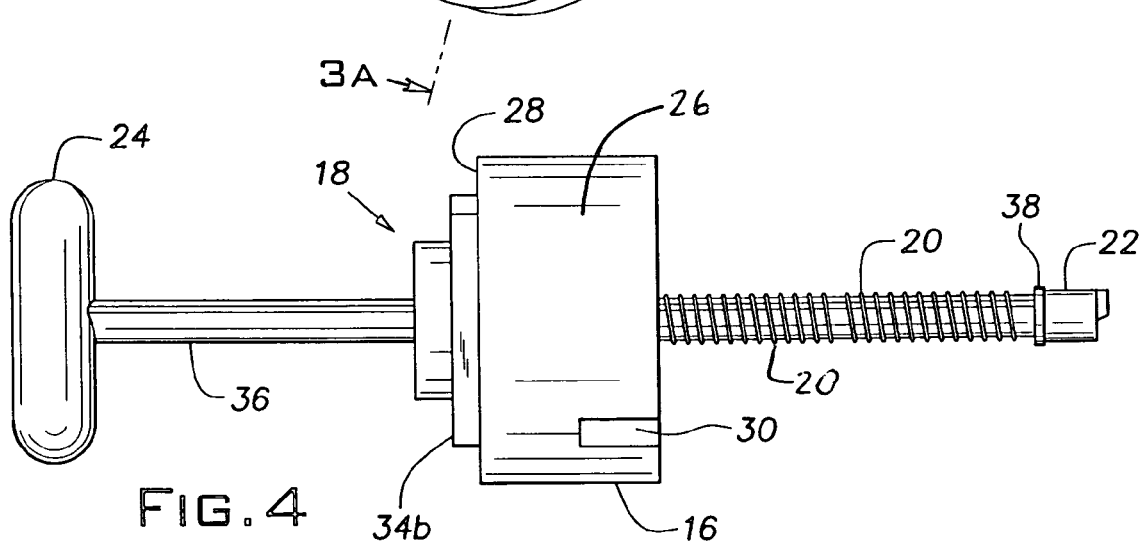
FIG. 4 is a side view of the steering column manual stamping fixture.

The sliding member 36 has a first end to which the handle 24 is affixed and a second end to which the marking punch 22 is affixed. It will be appreciated that the handle 24 may be permanently or removably affixed to the sliding member 36 by pins, screws, welding, or the like, while the marking punch 22 is preferably removably attached to the second end of the member 36 (i.e., by a transverse pin) to facilitate replacement thereof when the edge of the marking punch 22 dulls. With reference to FIGS. 4 and 5, it will be appreciated that an enlarged or radially extending washer 38 interposed between the punch 22 and the sliding member 36. The washer 38 receives one end of the compression springs 20. The compression springs 20 are placed around the member 36 and are trapped between the marking punch 22 and the second end of the recirculating ball bearing 34a at the inner surface of the body member end wall 28. Preferably two compression springs 20 are used; one adjacent the recirculating ball bearing 34a and one adjacent the washer 38. Naturally, it is contemplated that more or less than two springs 20 could also be used. The position of the marking punch edge is important, and is controlled during installation of the marking fixture 10 on the checking fixture 12 so as to be in precise alignment with the steering column neutral or zero position determined by the checking fixture 12, as described hereinafter. Although the separate washer 38 is preferred, it is considered apparent that the marking punch 22 may integrally include a radially extending surface that can serve the same purpose as the washer 38.

The master steering check fixture of the '989 application includes a steering column adapter 42, a center hub 44, an outer ring 46, and three arms 48 that extend radially from the hub 44 so as to interconnect the hub 44 with the outer ring 46. The steering column adapter 42 includes a hollow shaft that extends from a bottom surface of the hub 44 and has an internally splined distal end that fits over the exposed splined end of the steering column 14 so as to rotatably link the master steering check fixture 12 with the steering column 14. The outer ring 46 includes a series of marks, which sequentially progress clockwise and counterclockwise from a center zero position aligned with one of the arms 48. Each mark on the outer ring 46 corresponds to a single spline on the steering column. A center arm 48 includes a zero reference line 48a. As described in U.S. patent application Ser. No. 10/979,968, the alignment marks are used, in conjunction with rotation of the master steering check fixture 12, to determine a center or neutral position of the steering column, and to place a center position of the steering column in alignment with the zero reference line 48a on the center one of the arms 48.

Figure 3A:
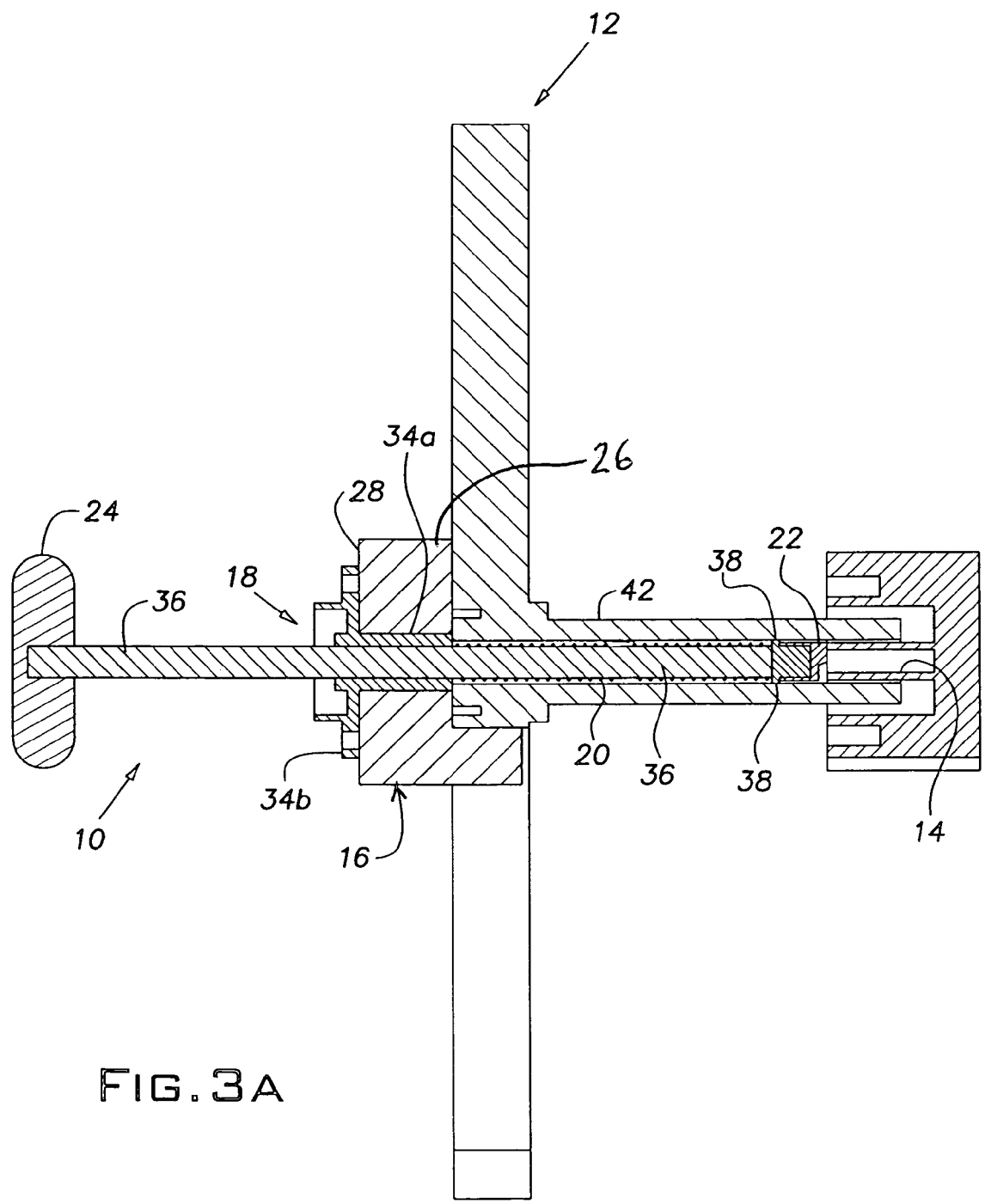
FIG. 3A is a cross-sectional view as seen along line 3A-3A of FIG. 2.
Figure 3B:
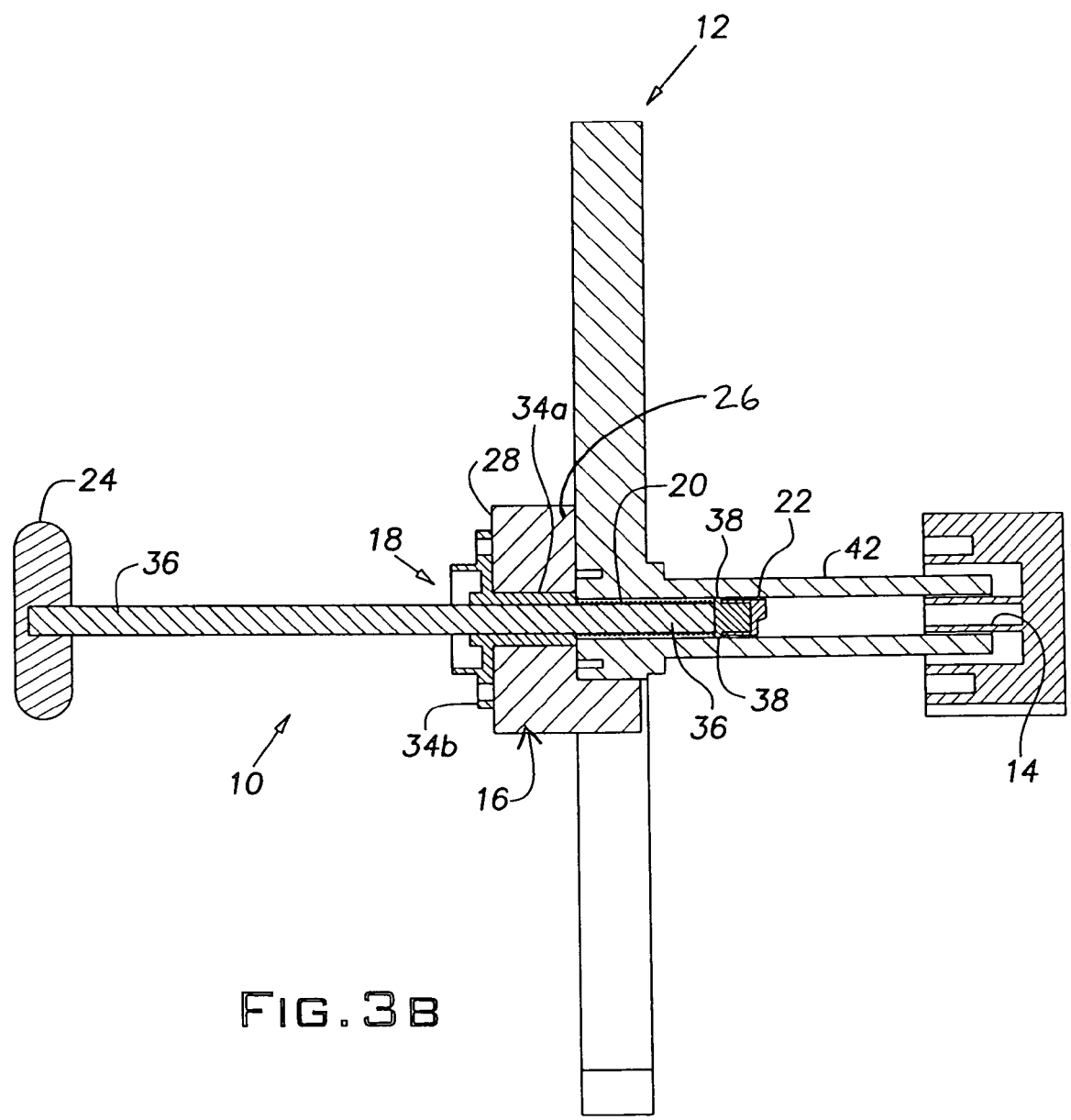
FIG. 3B is a cross-sectional view, similar to FIG. 3A, but showing the stamping fixture with a handle pulled back to compress a spring thereof.

FIG. 1 shows the master steering check fixture 12 and stamping fixture 10 prior to placement over the steering column 14. FIGS. 2 and 3 illustrate the check fixture 12 and stamping fixture 10 mounted to the steering column 14. Ordinarily, the center/neutral position of the steering column 14 will be located by using the check fixture 12 and, thereafter, the stamping fixture 10 will placed over the check fixture 12 by inserting the marking punch 22 into the opening in the hub 44 and through the adapter 42, and aligning the slots 30 in the body member 16 such that they fit over the arms 48 of the check fixture 12. As noted hereinbefore, the arms 48 and slots 30 are positioned such that the marking fixture 10 can only be placed on the check fixture 12 in one orientation. In this orientation, the edge of the marking punch 22 will be aligned with the zero or centered position of the steering column, and a zero reference line 16a on the body member 16 will be aligned with the zero reference line 48a on the center arm 48.

While reference to the U.S. patent application Ser. No. 10/979,968 should be made for detailed information on the structure and normal use of the check fixture 12, generally the check fixture 12 is disposed over the steering column such that the splined end of the adaptor 42 is rotatably linked to the splines of the steering column 14. Thereafter, the check fixture outer ring 46 is rotated first in one direction (e.g. clockwise) as far as possible, and the number on the ring is relative to the zero reference mark 48a on the center arm 48 is read by the user. Then the ring 46 is rotated in the opposite direction (i.e., counterclockwise) as far as possible, and the number on the ring 46 relative to the zero reference mark 48a is read by the user. Thereafter, a look-up table is consulted and it is determined, based upon the readings, whether the check fixture 12 is centered on the steering column 14 (i.e., whether net rotation of the check fixture 12 in the clockwise and counterclockwise directions is equal, indicative of the steering column being in a neutral position and the check fixture 12 being centered). If the check fixture 12 is centered, the marking fixture 10 may be placed thereover and used, as described hereinafter, to mark a center position on the steering column 14.

If it is determined that the check fixture 12 is not centered on the steering column 14 (i.e., the steering column is not in a centered or neutral position), the lookup table gives information to the user as to which direction (clockwise/ counterclockwise) and amount that the check fixture 12 must be rotated relative to the steering column 14 in order to center the check fixture 12 on the steering column 14. The amounts are usually expressed in the number of spline teeth—e.g., one tooth clockwise, two teeth counterclockwise, etc, with it being remembered that the marks on the check fixture correspond to the spline teeth. Then, the operator must remove the check fixture 12 from the steering column 14, rotate the check fixture 12 the prescribed direction and amount relative to the steering column 14, replace the check fixture 12 on the steering column 14, and repeat the test. Once it is determined that the check fixture 12 is centered on the steering column (i.e., the zero reference mark 48a is aligned with a center or neutral position of the steering column 14) a marking procedure may commence.

A marking procedure beings with the checking fixture 12 centered on the steering column 14 such that the zero reference line 48a on the center arm is aligned with a neutral position that is to be marked on the steering column 14. Then the marking punch 22 is inserted through the center hub 44 of the check fixture 12 and through the adaptor 42. As noted hereinbefore, the slots 30 in the body member 16 will only fit over the arms 48 in one orientation; the orientation in which the edge of the marking punch 22, the zero reference mark 48a on the center arm, and the zero reference line 16a on the body member 16 are in mutual alignment with one another. The mounting procedure is easy and fail-safe. The user may easily visually align the zero reference marks 16a, 48a. Moreover, the user may see and feel that the arms 48 are received in the slots 30. Further, it will be appreciated that no marking of the steering column 14 will occur if the body member 16 is improperly mounted over the checking fixture 12.

Once the stamping fixture 10 is properly aligned with and placed over the checking fixture 12, the user simply holds the stamping fixture body member 16 against the hub 44 and arms 48 of the checking fixture 12, and pulls the handle 24 relatively away from the body member 16 so as to compress the springs 20 as the marking punch 22 is slid away from the steering column 14. When the springs reach maximum compression, the handle 24 cannot be pulled any further away from the body member 16. Subsequent release of the handle 24 by the user permits the springs 20 to decompress or expand and drive the marking punch 22 into the face of the steering column 14, scoring the steering column and thereby providing an alignment mark that is disposed at the center or neutral position of the steering column and which may be used for subsequent orientation of the steering wheel relative to the steering column. Once the steering column is marked, the stamping fixture 10 and checking fixture 12 may be removed from the steering column 14, and the vehicle passed for further assembly.

While the present invention has been described herein with specificity, it is considered apparent that numerous modifications and replacements of parts may be resorted to without departing from the scope and spirit of the present invention. It is further considered apparent that the steps of the method of the present invention may be modified without deviating from the present invention. Accordingly, the foregoing is not intended to limit the present invention, but rather is considered to only be illustrative of the preferred embodiments, with the full scope of the present invention only being defined by the claims appended hereto.

What is claimed is:

1. An assembly for making an alignment mark on a steering column, comprising:

a check fixture including an outer ring, a central hub, and a series of arms extending between said outer ring and the hub, wherein said fixture is adapted to be rotatably secured to said steering column; and, a steering column stamping fixture, said stamping fixture including a body member and a marking punch, said body member being received over said check fixture and said marking punch extending through said hub and being driven into engagement with the steering column so as to place an alignment mark on said steering column.

2. The assembly according to claim 1, wherein the stamping fixture includes a sliding member that is movable relative to said body member and that has a first end and a second end, said marking punch being disposed on the second end of said sliding member.

3. The assembly according to claim 2, wherein a handle is secured to the first end of the sliding member.

4. The assembly according to claim 2, wherein at least one spring is disposed around said sliding member and serves to bias said marking punch away from said body member.

5. The assembly according to claim 1, wherein check fixture further includes an adapter that extends between said hub and said steering column, said adapter being a hollow shaft having an internally splined distal end that is fit over an externally splined surface of said steering column, and wherein said stamping fixture further includes a linear bearing assembly including a recirculating ball bearing fixed to said body member and a sliding member that extends through said bearing, said sliding member including a first end that holds a handle and a second end that holds said marking punch, said handle being grasped and pulled by a user to move said marking punch linearly within said adapter.

6. The assembly according to claim 5, wherein said stamping fixture further comprises at least one compression spring that is received over said sliding member and between said body member and said marking punch, and wherein said compression spring is compressed as said handle is moved relatively away from said body member and wherein said spring is operable to bias said marking punch toward the steering column.

7. A manual stamping fixture for making an alignment mark on a steering column, comprising:

a cup-shaped body member having a cylindrical sidewall and an end wall, wherein said cylindrical sidewall has a circular rim at an end of the sidewall opposite the end wall, and wherein slots are formed in the cylindrical sidewall and extend from the circular rim toward the end wall;

a linear bearing assembly that is secured to said body member, said bearing assembly including a stationary body and a sliding member, said stationary body being immovably fixed to said body member end wall and said sliding member being slidably secured to said stationary body;

a handle secured to a first end of said sliding member;

a marking punch secured to a second end of said sliding member; and, at least one spring to urge said marking punch away from said body member.

8. The manual stamping fixture of claim 7, wherein said spring is a compression spring and is disposed between said body member and said marking punch.

9. The manual stamping fixture of claim 8, further comprising a washer disposed between said marking punch and said sliding member, and wherein said spring is disposed between said washer and said body member.

10. The manual stamping fixture of claim 7, wherein the slots are disposed so as to fit over arms of a manual steering column alignment fixture so as to properly locate the marking punch relative to the steering column to be marked.

11. A method for making an alignment mark on a steering column, comprising the steps of:

positioning a checking fixture on a steering column;

manipulating said checking fixture and steering column to insure that a reference mark on said checking fixture is disposed at a neutral position of said steering column;

mounting a stamping fixture on said checking fixture, said marking device including a base, a sliding member, and a biasing spring, said base being removably positioned over said fixture at a predefined orientation, said sliding member extending from said base and having a first end and a second end, said first end including a handle that may be grasped by a user, said second end including a marking punch and facing said steering column, said biasing spring urging said marking punch away from said base and toward said steering column;

holding said base against said checking fixture;

pulling said handle away from the base so as to move said marking punch away from said steering column and against the bias of said biasing spring; and releasing said handle to permit said marking punch to be driven into said steering column by said biasing spring, so as to place an alignment mark on said steering column.

\* \* \* \* \*